(12) United States Patent
Ikema

(10) Patent No.: US 11,548,172 B2
(45) Date of Patent: Jan. 10, 2023

(54) ROBOT

(71) Applicant: Seiko Epson Corporation, Tokyo (JP)

(72) Inventor: Takehito Ikema, Nakazato (JP)

(73) Assignee: SEIKO EPSON CORPORATION

(*) Notice: Subject to any disclaimer, the term of this patent is extended or adjusted under 35 U.S.C. 154(b) by 0 days.

(21) Appl. No.: 17/392,312

(22) Filed: Aug. 3, 2021

(65) Prior Publication Data

US 2022/0040869 A1    Feb. 10, 2022

(30) Foreign Application Priority Data

Aug. 4, 2020   (JP) .............................. JP2020-132230

(51) Int. Cl.
| | |
|---|---|
| *B25J 18/04* | (2006.01) |
| *B25J 19/00* | (2006.01) |
| *B25J 9/04* | (2006.01) |
| *B25J 9/00* | (2006.01) |
| *B25J 9/10* | (2006.01) |

(52) U.S. Cl.
CPC ......... *B25J 19/0083* (2013.01); *B25J 9/0009* (2013.01); *B25J 9/042* (2013.01); *B25J 9/108* (2013.01); *B25J 18/04* (2013.01)

(58) Field of Classification Search
CPC .... F16C 29/08; B25J 19/0075; B25J 19/0083; B25J 9/044; B25J 9/043; F16H 25/2418; F16H 2025/2436
See application file for complete search history.

(56) References Cited

U.S. PATENT DOCUMENTS

| | | | | |
|---|---|---|---|---|
| 4,607,852 A * | 8/1986 | Hoh | ...................... | G21F 7/061 |
| | | | | 277/315 |
| 5,127,281 A * | 7/1992 | Yanawgisawa | ..... | F16H 25/2018 |
| | | | | 74/89.38 |
| 5,327,795 A * | 7/1994 | Katahira | ................ | G05B 19/19 |
| | | | | 74/89.3 |
| 5,676,472 A * | 10/1997 | Solomon | ................ | B25J 21/005 |
| | | | | 384/480 |
| 5,695,288 A * | 12/1997 | Sugihara | ............. | F16C 29/0688 |
| | | | | 384/44 |
| 8,668,060 B2 * | 3/2014 | Kondo | ................... | B60G 13/02 |
| | | | | 188/267 |
| 2004/0237154 A1 * | 11/2004 | Hezel | ................... | B25J 19/0083 |
| | | | | 901/29 |

(Continued)

FOREIGN PATENT DOCUMENTS

| | | | | |
|---|---|---|---|---|
| JP | 2010-280019 A | 12/2010 | | |
| WO | WO-2014125691 A1 * | 8/2014 | .......... | B25J 19/0066 |

*Primary Examiner* — Jake Cook
*Assistant Examiner* — Gregory Robert Weber
(74) *Attorney, Agent, or Firm* — Harness, Dickey & Pierce, P.L.C.

(57) ABSTRACT

A robot having a shaft extending in vertical directions at an end of an arm pivoting in horizontal directions around a pivot axis parallel to the vertical directions and performing work using an end effector attached to a lower end of the shaft, the shaft having a helical groove and a longitudinal groove to enable upward and downward motion in the vertical directions and pivot around an axis of the shaft, includes a ring-shaped packing having a convex portion to engage with the longitudinal groove, fitted on the shaft, and sandwiched and fixed by a stopper portion and a collar portion in an extension direction of the shaft.

7 Claims, 12 Drawing Sheets

(56) References Cited

U.S. PATENT DOCUMENTS

| | | | | |
|---|---|---|---|---|
| 2005/0087034 | A1* | 4/2005 | Friedrich | B25J 19/0075 |
| | | | | 74/490.03 |
| 2017/0182669 | A1* | 6/2017 | Bordegnoni | B25J 9/0009 |
| 2019/0366563 | A1* | 12/2019 | Tanaka | B25J 19/021 |
| 2020/0189647 | A1* | 6/2020 | Schmidt | B62D 1/20 |
| 2020/0370652 | A1* | 11/2020 | Souk | B25J 19/0075 |

* cited by examiner

ROBOT

The present application is based on, and claims priority from JP Application Serial Number 2020-132230, filed Aug. 4, 2020, the disclosure of which is hereby incorporated by reference herein in its entirety.

BACKGROUND

1. Technical Field

The present disclosure relates to a robot.

2. Related Art

In manufacturing sites of related art, industrial robots are introduced in various environments to meet needs for automation. For example, JP-A-2010-280019 discloses a SCARA robot used in an environment in which liquids including water fly in all directions.

In JP-A-2010-280019, one end portion of a bellows cover member is coupled to an upper portion of an extension shaft coupled to an upper end of a ball screw spline shaft (BNS shaft) and the other end portion of the bellows cover member containing the extension shaft and the ball screw spline shaft is attached to a second arm, and thereby, the SCARA robot prevents entry of the liquids from the upper part. A tubular portion of the upper part of the extension shaft to which the one end portion of the bellows cover member is coupled employs a waterproof structure coated with a liquid gasket around the outer circumference and further fastened by a clamp band via an elastic sheet having low hardness.

However, the waterproof structure of the bellows cover member of the SCARA robot in JP-A-2010-280019 has room for improvement. Further, waterproof structures are not considered for a plurality of longitudinal grooves in the ball screw spline shaft, and the liquids including water may enter the SCARA robot.

SUMMARY

A robot according to an aspect of the present disclosure is a robot including a shaft extending in vertical directions at an end of an arm pivoting in horizontal directions around a pivot axis parallel to the vertical directions and performing work using an end effector attached to a lower end of the shaft, in which the shaft has a helical groove and a longitudinal groove to enable upward and downward motion in the vertical directions and pivot around an axis of the shaft, a ring-shaped packing having a convex portion to engage with the longitudinal groove is fitted on the shaft, and the packing is sandwiched and fixed by a stopper portion and a collar portion in an extension direction of the shaft.

A robot according to an aspect of the present disclosure is a robot including a shaft extending in vertical directions at an end of an arm pivoting in horizontal directions around a pivot axis parallel to the vertical directions and performing work using an end effector attached to a lower end of the shaft, in which the shaft having a helical groove and a longitudinal groove to enable upward and downward motion in the vertical directions and pivot around an axis of the shaft, the robot includes waterproof covers having bellows structures respectively in an upper portion and a lower portion of the shaft with the arm interposed therebetween, and the robot has a labyrinthine structure extending upward in the vertical direction between a bearing nut fixing a bearing in contact with the shaft and rotating integrally with the shaft and a bearing holder fixing end portions of the waterproof covers in the vertical directions.

A robot according to an aspect of the present disclosure is a robot including a shaft extending in vertical directions at an end of an arm pivoting in horizontal directions around a pivot axis parallel to the vertical directions and performing work using an end effector attached to a lower end of the shaft, in which the shaft has a helical groove and a longitudinal groove to enable upward and downward motion in the vertical directions and pivot around an axis of the shaft, the robot includes waterproof covers having bellows structures respectively in an upper portion and a lower portion of the shaft with the arm interposed therebetween, end portions of the waterproof covers have flange shapes extending in directions crossing a direction of the axis, and the end portions are sandwiched and fixed by base portions and nut portions in the vertical directions.

A robot according to an aspect of the present disclosure is a robot including a shaft extending in vertical directions at an end of an arm pivoting in horizontal directions around a pivot axis parallel to the vertical directions and performing work using an end effector attached to a lower end of the shaft, in which the shaft has a helical groove and a longitudinal groove to enable upward and downward motion in the vertical directions and pivot around an axis of the shaft, and the robot includes waterproof covers having bellows structures respectively in an upper portion and a lower portion of the shaft with the arm interposed therebetween.

DESCRIPTION OF EXEMPLARY EMBODIMENTS

1. SCARA Robot

Figure 1:
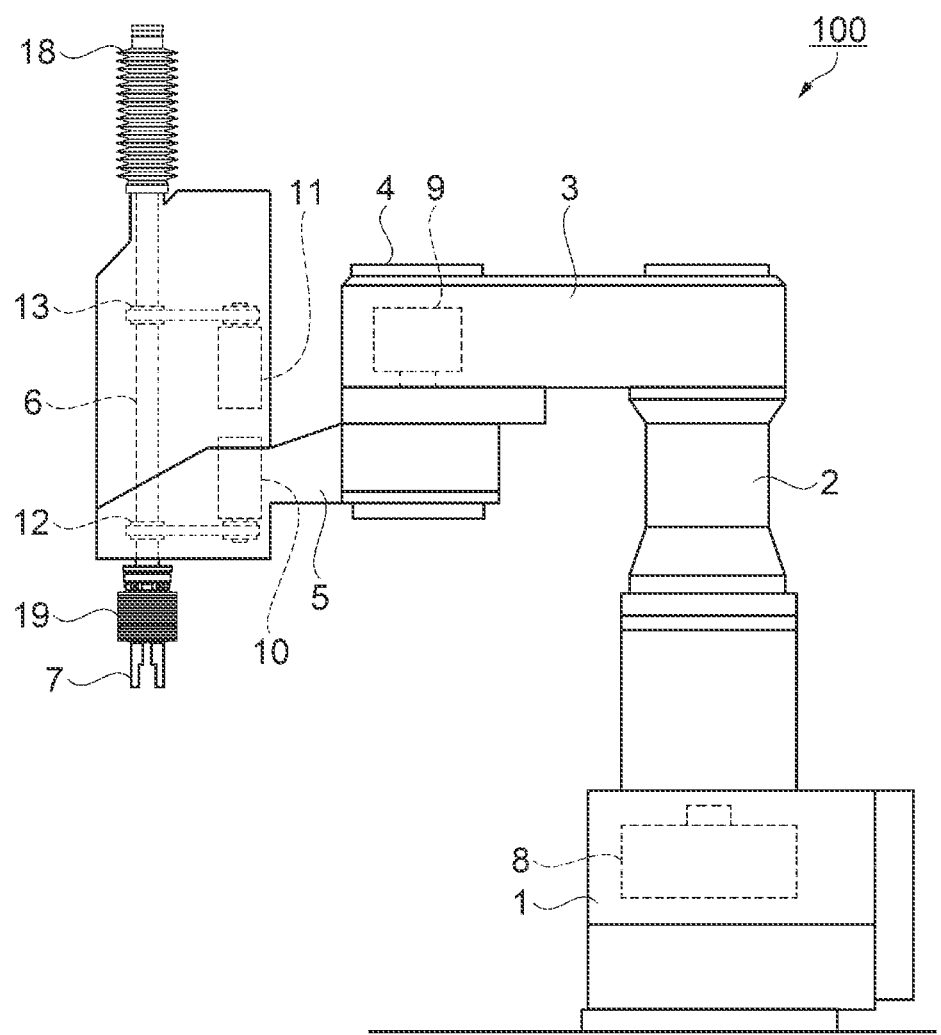
FIG. 1 is a schematic configuration diagram of a SCARA robot according to an embodiment.

FIG. 1 is a schematic configuration diagram of a SCARA robot according to embodiment 1.

A SCARA robot 100 as a robot according to the embodiment will be explained. Note that, in the following explanation, "upper" and "lower" show upper and lower along vertical directions.

The SCARA robot 100 according to the embodiment shown in FIG. 1 is a horizontal articulated robot and includes a base 1, an arm supporting shaft 2, a first arm 3, an arm coupling shaft 4, a second arm 5, a shaft 6, an end effector 7, a first drive motor 8, a second drive motor 9, a third drive motor 10, a fourth drive motor 11, and cover members 18, 19.

The base 1 is fixed to a horizontal surface such as a floor surface or a ceiling surface and, in the embodiment, the base 1 is fixed to a floor surface. The arm supporting shaft 2 is provided to project upward from the base 1 on the floor surface and one end side of the first arm 3 is coupled to an upper end part of the arm supporting shaft 2, and the first arm 3 is horizontally supported.

The arm coupling shaft 4 is coupled to the other end portion of the first arm 3 and an end portion of the second arm 5, and the second arm 5 is coupled to the first arm 3 via the arm coupling shaft 4. Note that the first arm 3 corresponds to a supporting arm and the second arm 5 corresponds to an arm.

The second arm 5 pivots in the horizontal directions around a pivot axis parallel to the vertical directions by the arm coupling shaft 4. The shaft 6 extending in the vertical directions is provided at an end of the second arm 5 opposite to the side coupled to the first arm 3, and the end effector 7 is attached to the lower end of the shaft 6. The SCARA robot 100 may perform work using the end effector 7 attached to the lower end of the shaft 6.

Figure 2:
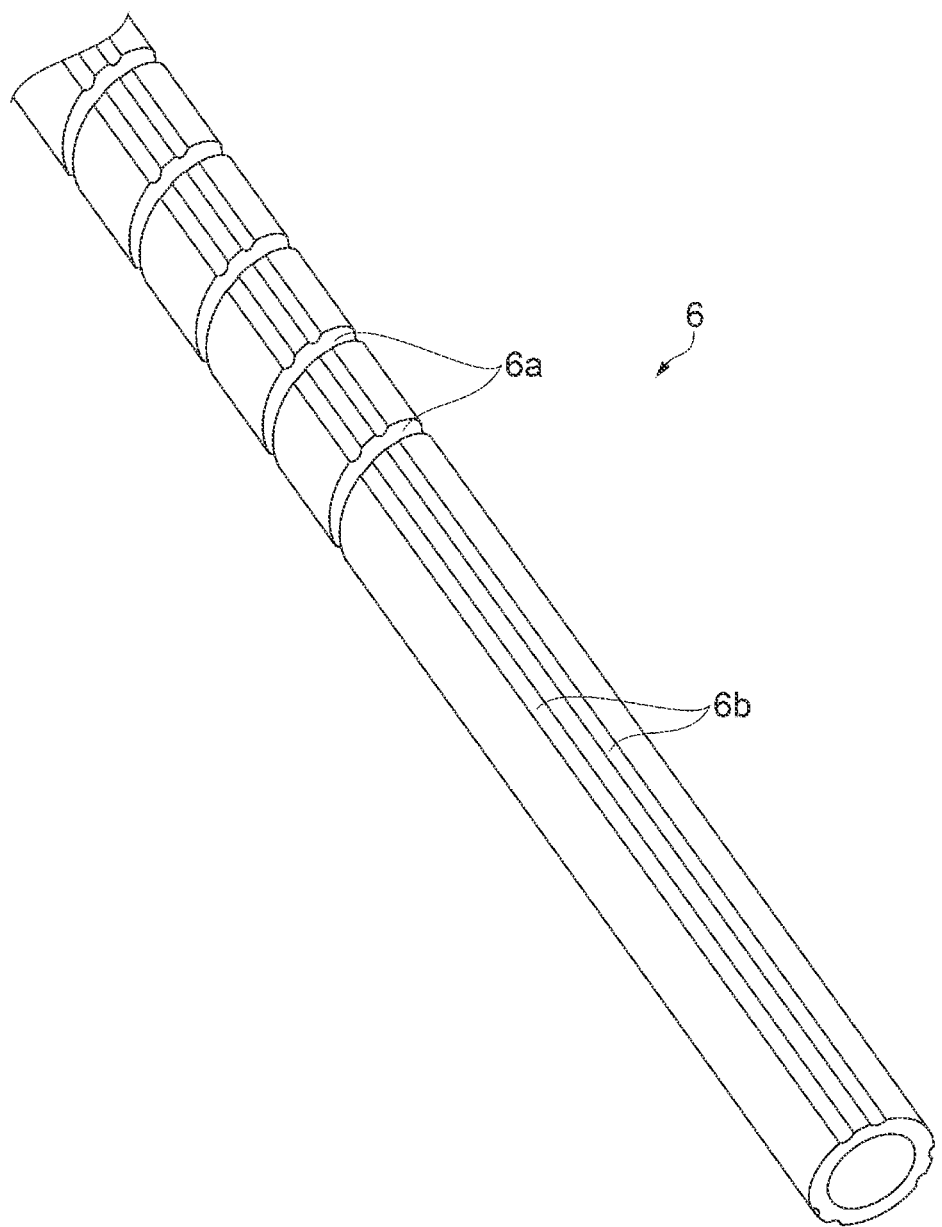
FIG. 2 is a perspective view showing a shaft.

FIG. 2 is a perspective view showing the shaft.

As shown in FIG. 2, the shaft 6 is a hollow portion having a center axis part formed to be hollow along the extension directions, and formed in a cylindrical shape having an outer surface as an outer circumference and an inner surface at the hollow portion side.

Further, the shaft 6 is a ball screw spline shaft in which a helical groove 6a helically running around along the outer surface from the upper end part to a predetermined position and longitudinal grooves 6b extending straight along the outer surface from the upper end part to the lower end part are formed. The shaft 6 can move upward and downward in the vertical directions by the helical groove 6a and axial pivot around the axis of the shaft 6 by the longitudinal grooves 6b.

A cable of the end effector 7 or the like passes through the inner surface side of the shaft 6 and the inner surface of the shaft 6 communicates with the outside air, and thereby, liquids including water may flow depending on the placement environment.

Hereinafter, in the shaft 6, a portion projecting upward from the second arm 5 is referred to as an upper portion of the shaft 6 and a portion projecting downward from the second arm 5 is referred to as a lower portion of the shaft 6. In other words, the upper portion of the shaft 6 and the lower portion of the shaft 6 are located with the second arm 5 in between.

Returning to FIG. 1.

The first drive motor 8 shown in FIG. 1 drives the first arm 3 around the axis of the arm supporting shaft 2 and the first drive motor 8 is provided within the base 1.

The second drive motor 9 drives the second arm 5 around the axis of the arm coupling shaft 4 and the second drive motor 9 is provided within the first arm 3.

The third drive motor 10 pivots the end effector 7 around the axis of the shaft 6 and rotation torque generated in the third drive motor 10 is transmitted to the shaft 6 via a ball spline nut 12.

The fourth drive motor 11 moves the end effector 7 upward and downward in the axial directions of the shaft 6 and rotation torque generated in the fourth drive motor 11 is transmitted to the shaft 6 via a ball screw nut 13.

Note that these third drive motor 10, fourth drive motor 11, ball spline nut 12, and ball screw nut 13 are provided within the second arm 5.

The cover members 18, 19 have bellows structures using urethane sheets and are stretchable in the axial directions of the shaft 6. The cover members 18, 19 have tubular portions at ends in the extension directions of the bellows structures. Flange-shaped end portions 18a, 18b, 19a, 19b extending in directions crossing the axial directions are formed from ends of the tubular portions and fixed, which will be described later in detail. Thereby, the cover member 18 is provided to contain the upper portion of the shaft 6, and the cover member 19 is provided to contain the lower portion of the shaft 6. The cover members 18, 19 correspond to waterproof covers. Note that the cover members 18, 19 may be formed by e.g. blow molding.

1.1 Upper Portion of Shaft 6

Figure 7:
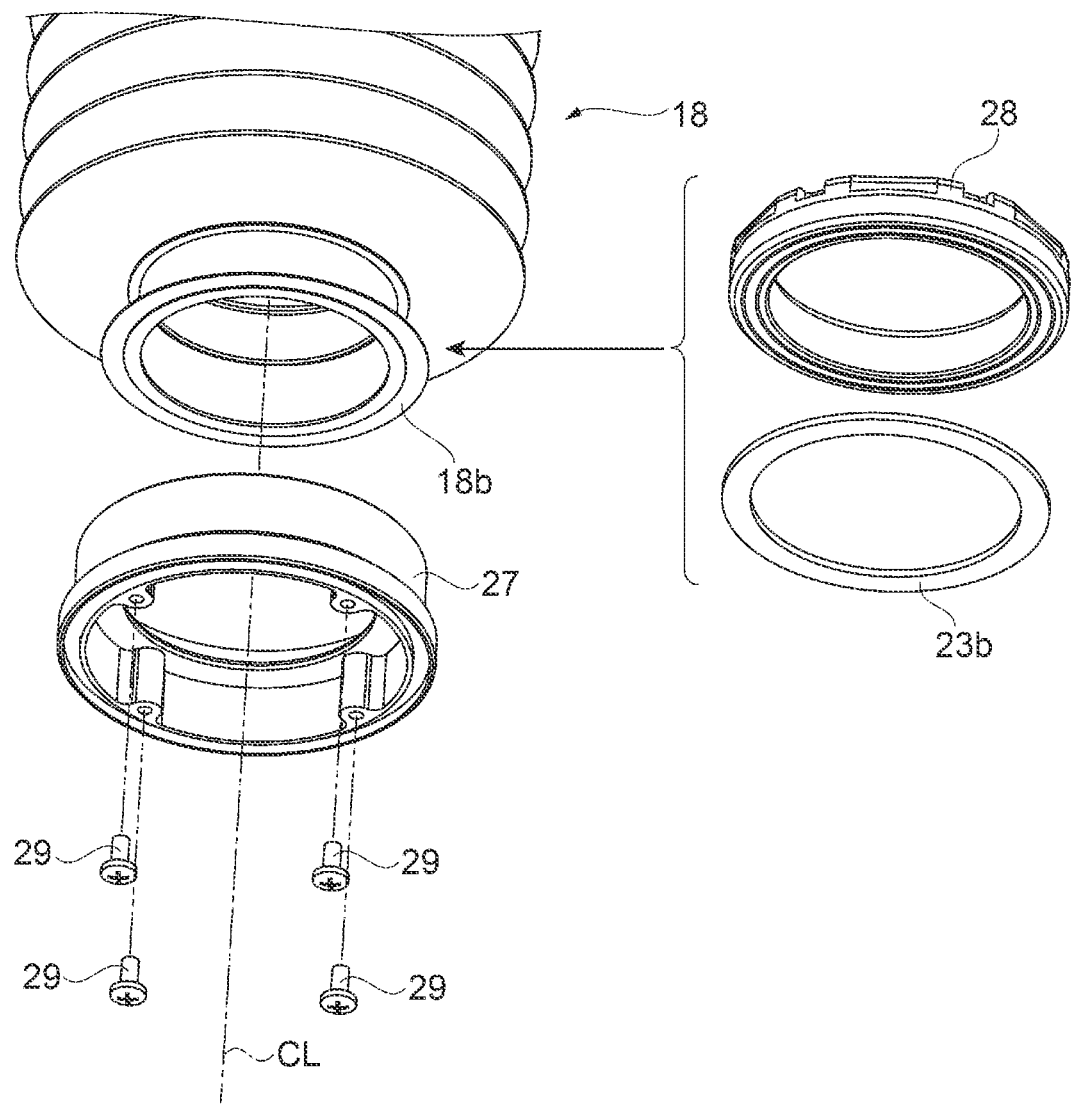
FIG. 7 is a partially exploded view showing the lower end B in FIG. 3.

The upper portion configuration of the shaft 6 will be explained with reference to FIGS. 3 and 7.

Figure 3:
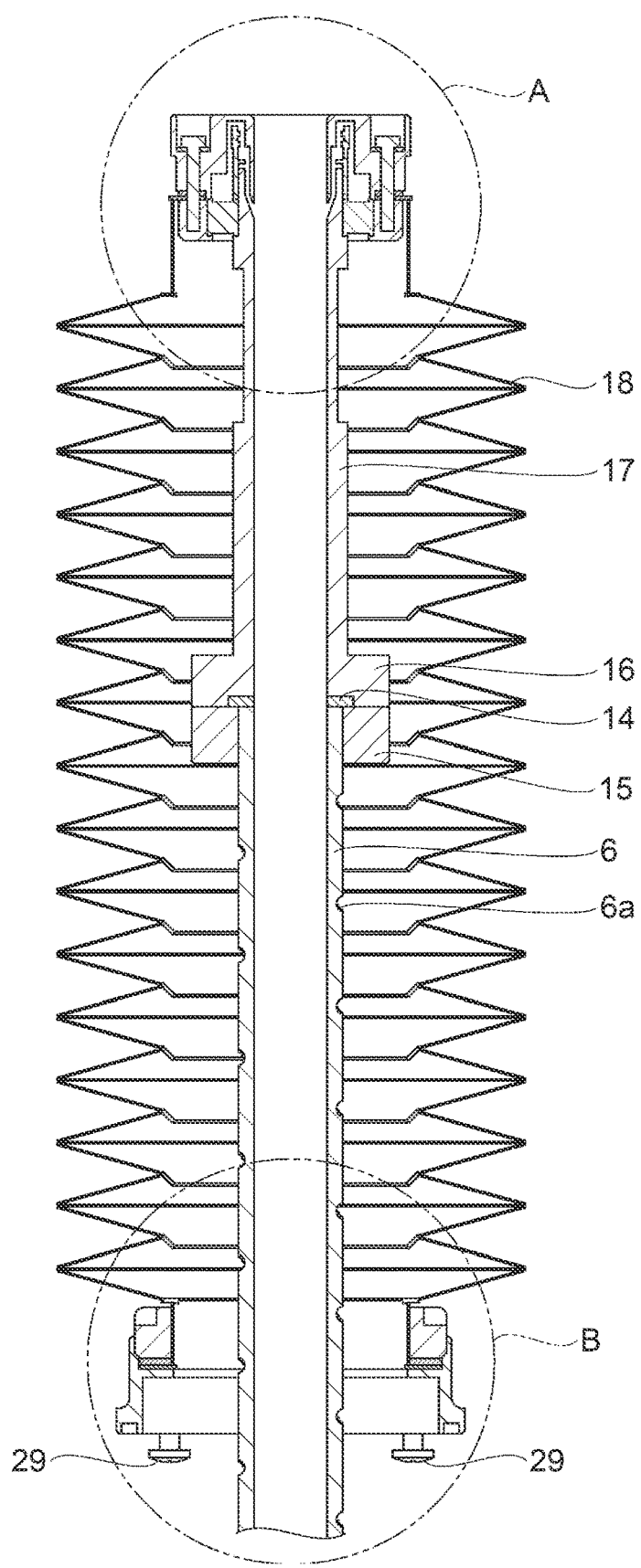
FIG. 3 is a sectional view showing an upper portion of the shaft.

In the upper portion of the shaft 6 shown in FIG. 3, an extension shaft 17 is coupled to the upper end part of the shaft 6 coaxially with the shaft 6. Like the shaft 6, the extension shaft 17 is a hollow portion having a center axis part formed to be hollow, and formed in a cylindrical shape having an outer surface as an outer circumference and an inner surface at the hollow portion side.

Specifically, a flange 15 is provided on the upper end part of the shaft 6 and a flange 16 is provided on the lower end part of the extension shaft 17. The flange 15 and the flange 16 are provided to project in the horizontal directions from the upper end part of the shaft 6 and the outer surface of the lower end part of the extension shaft 17. These flange 15 and flange 16 are joined with surfaces facing each other sandwiching a packing 14 and fixed by fastening of pluralities of bolts and nuts (not shown) in the axial directions. The packing 14 is formed using a closed-cell silicon sponge and the shaft 6 and the extension shaft 17 are joined fluid-tightly between inner surfaces.

Thereby, when water flows to the hollow portions of the shaft 6 and the extension shaft 17, the waterproof property in the coupling portion of the inner surfaces may be secured.

Note that, in this embodiment, the extension shaft 17 is coupled to the shaft 6, however, the shaft 6 may be extended and used without coupling of the extension shaft 17. In the embodiment, the extension shaft 17 is regarded as a part of the shaft 6 and the upper portion of the shaft 6 includes the extension shaft 17.

In the cover member 18 containing the upper portion of the shaft 6, the end portions 18a, 18b are liquid-tightly fixed in an upper end A and a lower end B and prevent entry of water into the SCARA robot 100.

Figure 4:
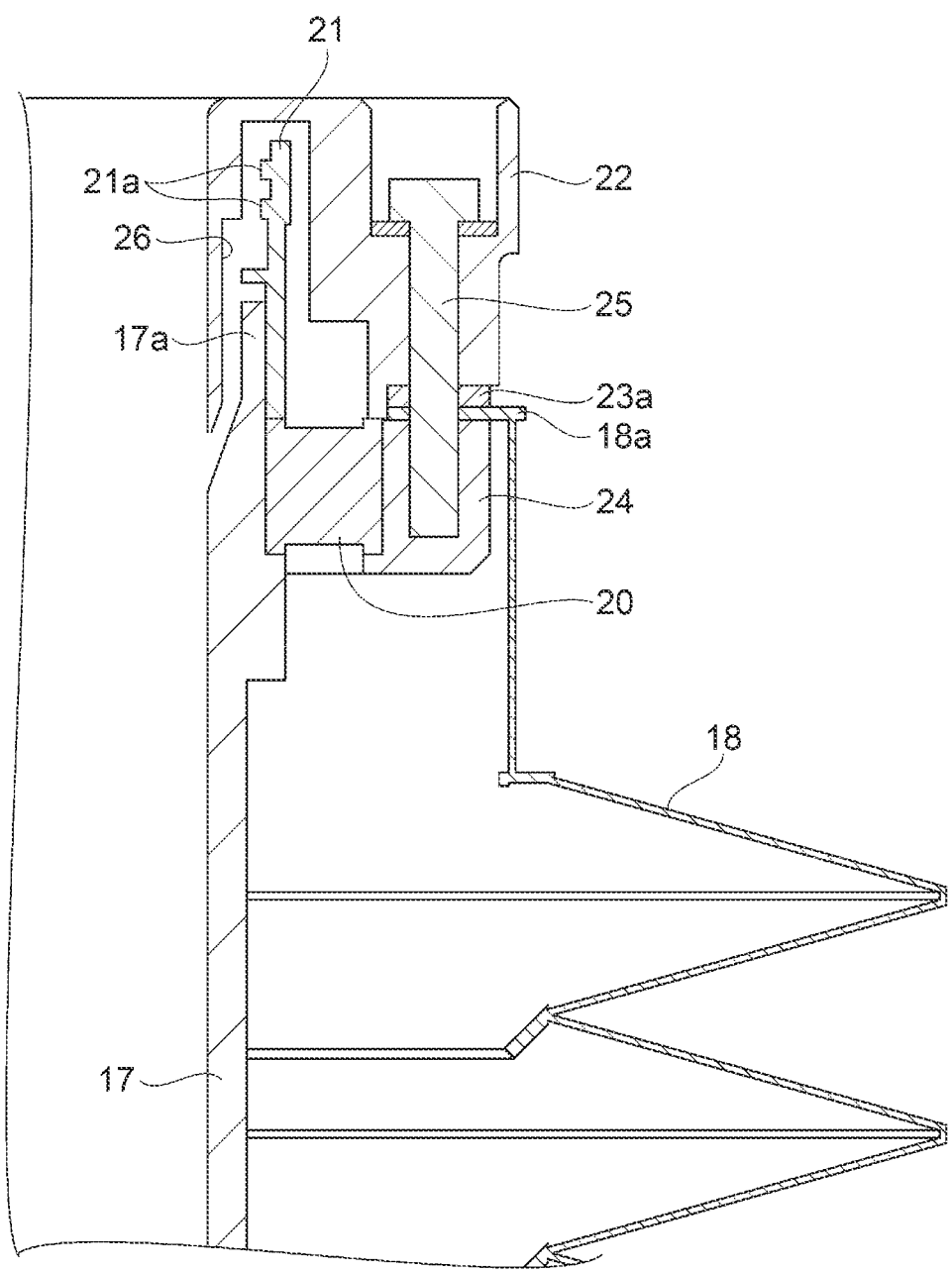
FIG. 4 is a partially sectional view showing an upper end A in FIG. 3.
Figure 5:
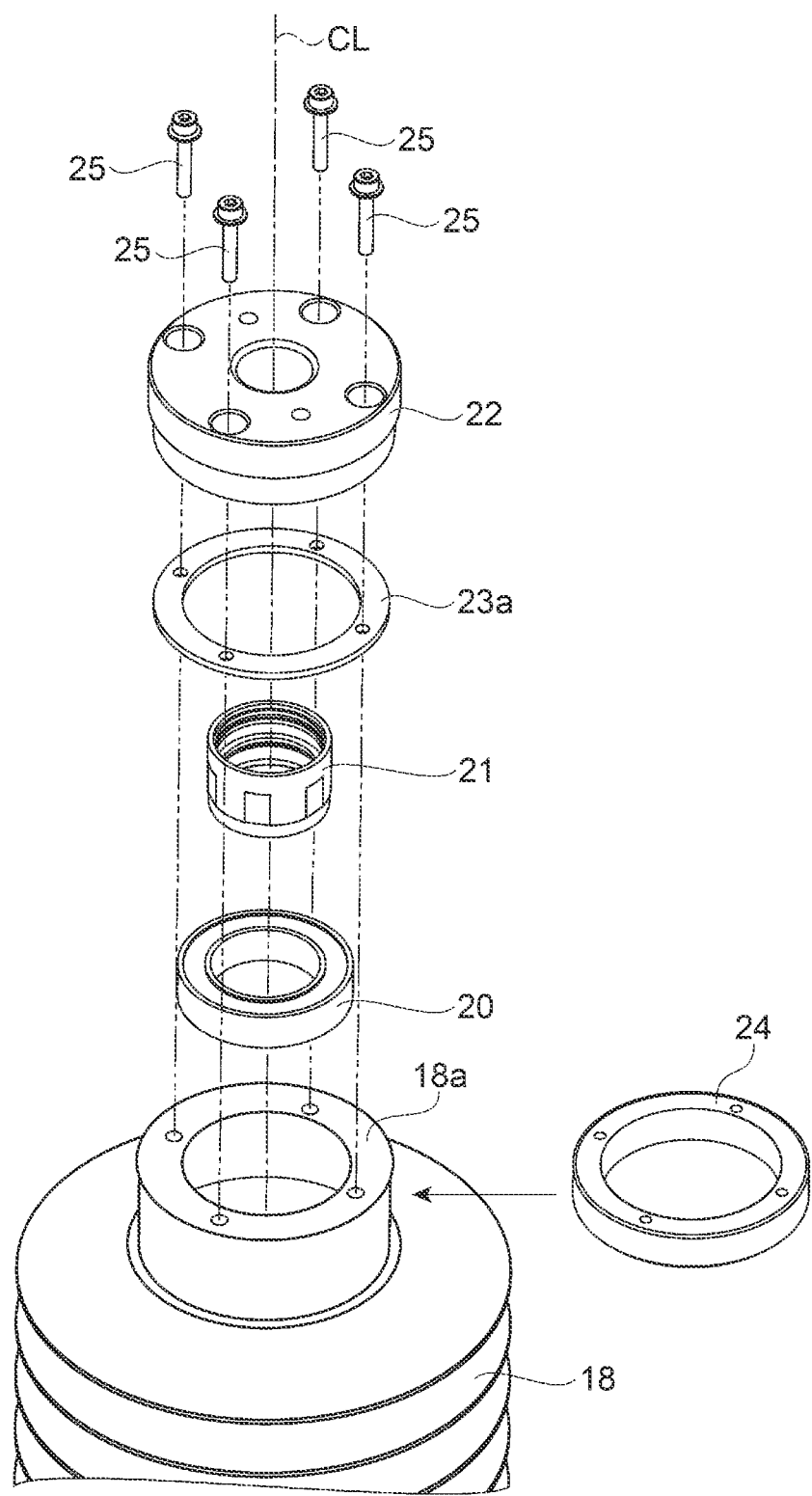
FIG. 5 is a partially exploded view showing the upper end A in FIG. 3.

The upper end A shown in FIGS. 4 and 5 will be explained.

In the upper end A, the cover member 18, a bearing 20, a bearing nut 21, a bearing presser 22, an elastic sheet 23a, a bearing holder 24, and four bolts 25 are provided to surround the extension shaft 17. A part of the cover member 18, the bearing 20, the bearing nut 21, the bearing presser 22, the elastic sheet 23a, and the bearing holder 24 have ring shapes or cylindrical shapes and are placed coaxially with the extension shaft 17.

The bearing 20 is formed in the ring shape. The bearing 20 is placed in contact with the outer surface of the extension shaft 17 and fixed to the bearing nut 21.

The bearing nut 21 is formed in the cylindrical shape and fixed to engage with an annular projecting portion 17a provided in the upper end part of the extension shaft 17 and rotates integrally with the extension shaft 17. Further, on the inner surface of the bearing nut 21, a plurality of projecting portions 21a projecting toward the center axis are provided in annular shapes along the inner surface.

The bearing presser 22 is provided to cover from above the extension shaft 17 and formed in the cylindrical shape having a portion overlapping with the extension shaft 17 in a plan view as a hollow portion. In the bearing presser 22, a concave portion 26 is provided on the lower surface at the inner surface side to provide an air gap between the bearing nut 21 and itself. Thereby, a labyrinthine structure extending upward in the vertical direction is obtained between the concave portion 26 of the bearing presser 22 and the bearing nut 21.

As described above, the labyrinthine structure is formed between the concave portion 26 of the bearing presser 22 and the bearing nut 21, and thereby, when water flows to the hollow portion of the extension shaft 17, if the water enters between the concave portion 26 and the bearing nut 21 from the inner surface of the extension shaft 17, entry to the upper part may be prevented by the projections 21a and entry into the robot may be prevented.

Further, on the lower surface at the outer surface side of the bearing presser 22, the end portion 18a of the cover member 18 is located via the elastic sheet 23a and the bearing holder 24 is located under the end portion 18a.

For the elastic sheet 23a, e.g. a rubber sheet is used and adhesion of the bearing presser 22 and the end portion 18a is improved.

The end portion 18a of the cover member 18 has a flange shape extending from the upper end of the tubular portion in the upper part of the cover member 18 in a direction crossing a center axis CL direction of the extension shaft 17. In other words, the end portion 18a is formed in a ring shape in a top view projecting from the upper end of the tubular portion in the center axis CL direction.

The bearing holder 24 is formed in the ring shape and may sandwich the upper end portion 18a from inside of the tubular portion in the upper part of the cover member 18 between the bearing presser 22 and itself. Note that, at the time of assembly, the bearing holder 24 deforms the end portion 18a of the cover member 18 and inserts the portion into the cover member 18.

In these bearing presser 22, elastic sheet 23a, and end portion 18a, holes are formed in four locations through which the bolts 25 penetrate. The bolts 25 penetrating the bearing presser 22, the elastic sheet 23a, and the end portion 18a from the upper part of the bearing presser 22 downward in the vertical direction are inserted into the screw holes of the bearing holder 24, fastened, and liquid-tightly fixed.

Figure 6:
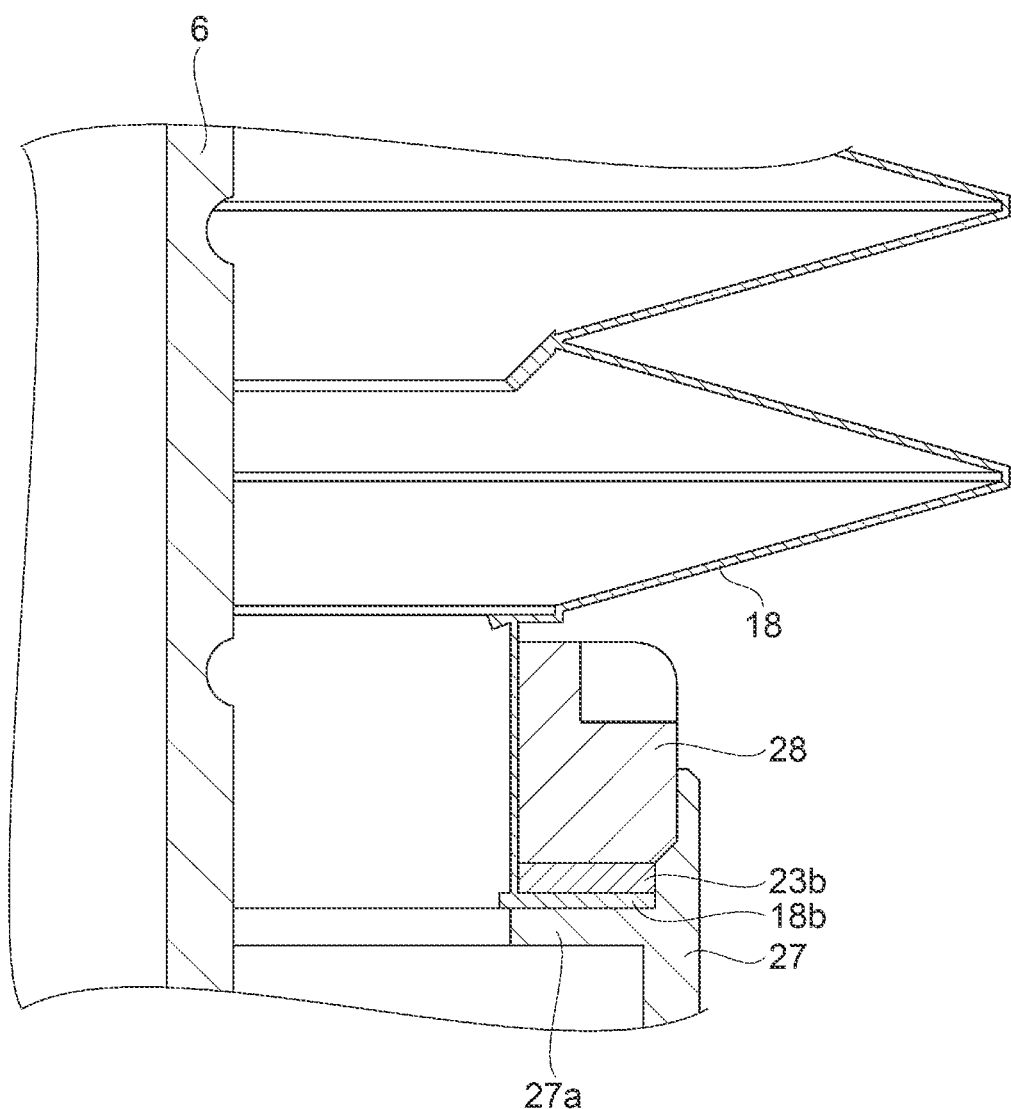
FIG. 6 is a partially sectional view showing a lower end B in FIG. 3.

Next, the lower end B shown in FIGS. 6 and 7 will be explained.

In the lower end B, the cover member 18, a presser base 27, an elastic sheet 23b, a nut 28, and four bolts 29 are provided to surround the shaft 6. A part of the cover member 18, the presser base 27, the elastic sheet 23b, and the nut 28 have ring shapes or cylindrical shapes and are placed coaxially with the shaft 6.

The presser base 27 is a female screw formed in the cylindrical shape provided with a thread groove that engages with the nut 28 in the upper part of the inner surface. Four screw holes to engage with the bolts 29 are provided in the lower part of the presser base 27, and the four bolts 29 are fastened via the second arm 5 (FIG. 1) and the presser base 27 is fixed to the second arm 5. On the inner surface of the presser base 27, a ring-shaped receiving portion 27a projecting toward the center axis CL is formed between the groove and the screw holes.

The end portion 18b of the cover member 18 is located in the upper part of the receiving portion 27a formed in the presser base 27, and the nut 28 is located in the upper part of the end portion 18b via the elastic sheet 23b.

For the elastic sheet 23b, e.g. a rubber sheet is used and adhesion of the nut 28 and the end portion 18b is improved.

The end portion 18b of the cover member 18 has a flange shape extending from the lower end of the tubular portion in the lower part of the cover member 18 in a direction crossing the axial direction of the extension shaft 17, i.e. in a radial direction from the center axis CL. In other words, the end portion 18b has a shape projecting outward from the lower end of the tubular portion in a flange shape.

The nut 28 is a male screw formed in the ring shape provided with a thread groove that engages with the presser base 27 in the lower part of the outer surface. The nut 28 is provided outside of the tubular portion in the lower part of the cover member 18, rotated using a cutout formed in the upper part of the outer surface, and thereby, may tighten downward and press the end portion 18b. For the nut 28, a resin e.g. nylon is used and, even when the nut contacts the adjacent cover member 18 while rotating, the nut does not damage the member. Note that, at the time of assembly, the nut 28 deforms the end portion 18b of the cover member 18 and fits the portion in the tubular portion of the cover member 18.

The end portion 18b is sandwiched by the nut 28 as the male screw and the receiving portion 27a of the presser base 27 as the female screw in the vertical direction, and pressed by rotation and screwing of the nut 28 and liquid-tightly fastened and fixed. The nut 28 of this embodiment corresponds to a nut portion and the presser base 27 corresponds to a base portion.

1.2 Lower Portion of Shaft 6

The lower portion configuration of the shaft 6 will be explained with reference to FIGS. 8 and 12.

Figure 8:
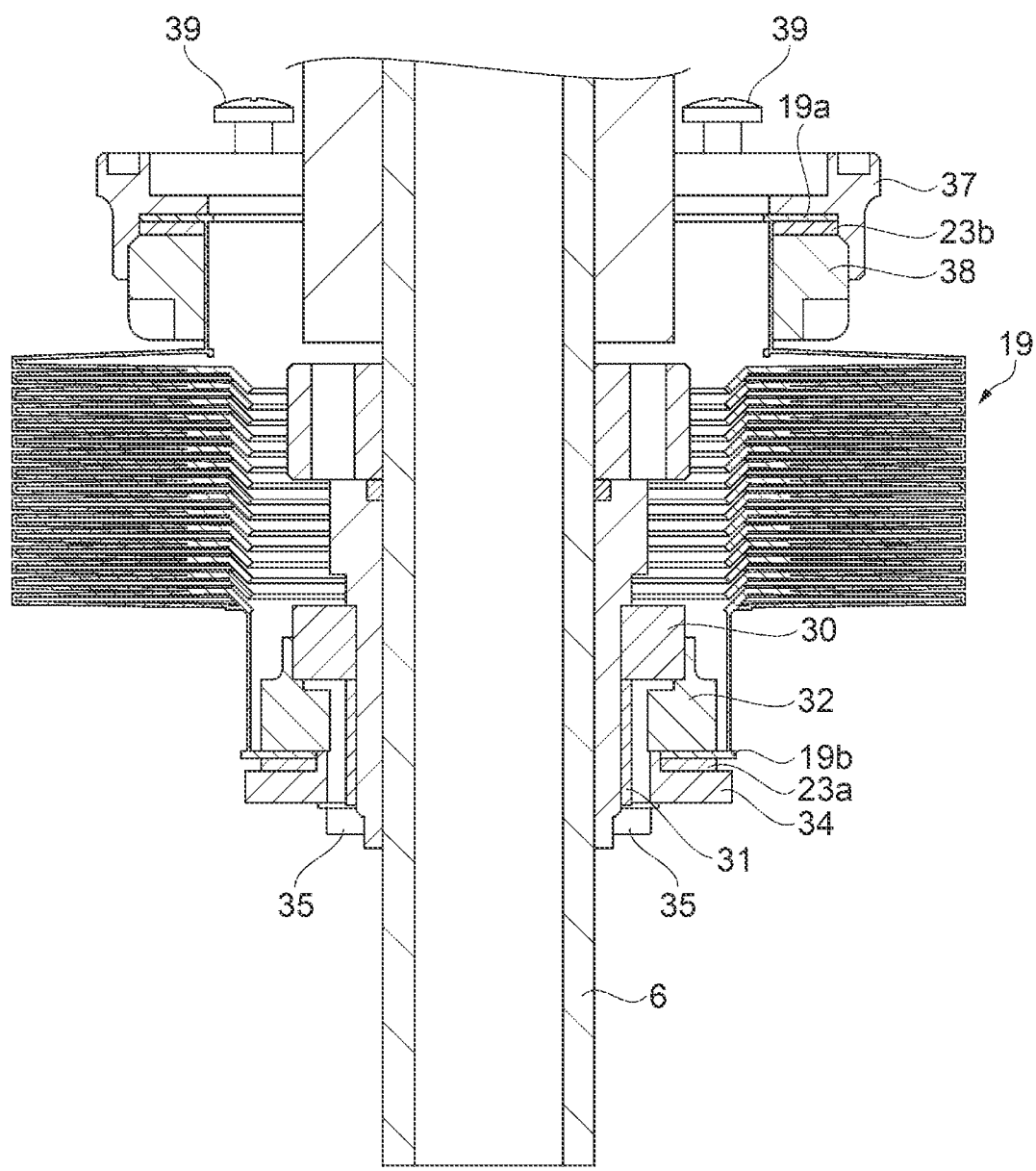
FIG. 8 is a sectional view showing a lower portion of the shaft.

In the lower portion of the shaft 6 shown in FIG. 8, in the cover member 19 containing the lower portion of the shaft 6, the end portions 19a, 19b are liquid-tightly fixed in an upper end and a lower end and prevent entry of water into the SCARA robot 100.

First, the upper end of the cover member 19 will be explained.

In the upper end of the cover member 19, the cover member 19, a presser base 37, the elastic sheet 23b, a nut 38, and four bolts 39 are provided to surround the shaft 6. A part of the cover member 19, the presser base 37, the elastic sheet 23b, and the nut 38 have ring shapes or cylindrical shapes and are placed coaxially with the shaft 6.

The cover member 19, the presser base 37, the elastic sheet 23b, the nut 38, and the four bolts 39 have configurations inverted to those of the above described lower end B in the vertical directions. The end portion 19a projecting from the upper end of the tubular portion of the cover member 19 to the outside in a flange shape is sandwiched by the presser base 37 as a female screw and the nut 38 as a male screw via the elastic sheet 23b in the vertical directions, and pressed and liquid-tightly fastened by rotation and screwing of the nut 38.

Four screw holes (not shown) to engage with the bolts 39 are provided in the upper part of the presser base 37, and the four bolts 39 are fastened via the second arm 5 and the presser base 37 is fixed to the second arm 5.

Next, the lower end of the cover member 19 will be explained.

Figure 9:
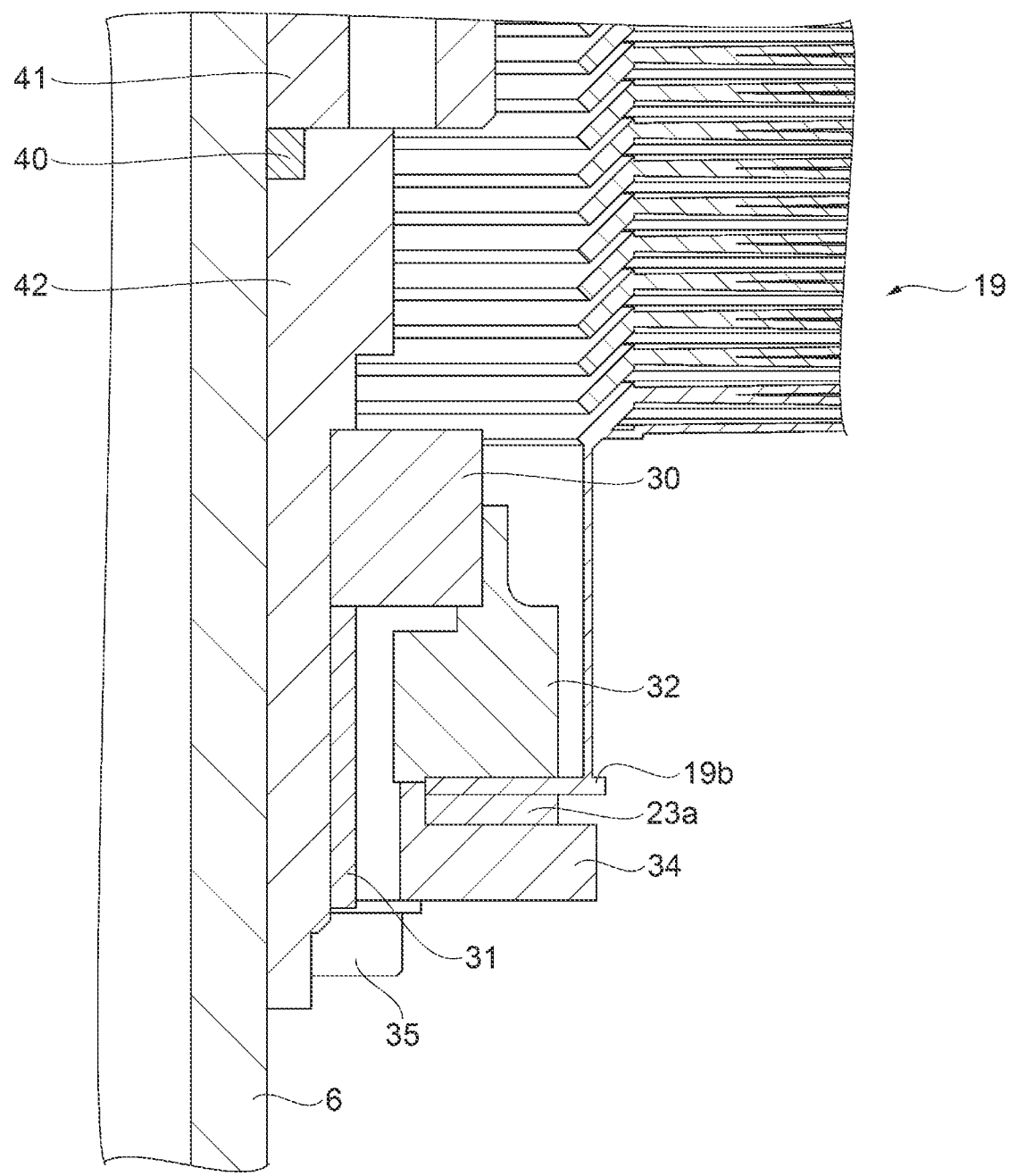
FIG. 9 is a partially sectional view showing a lower end in FIG. 8.
Figure 10:
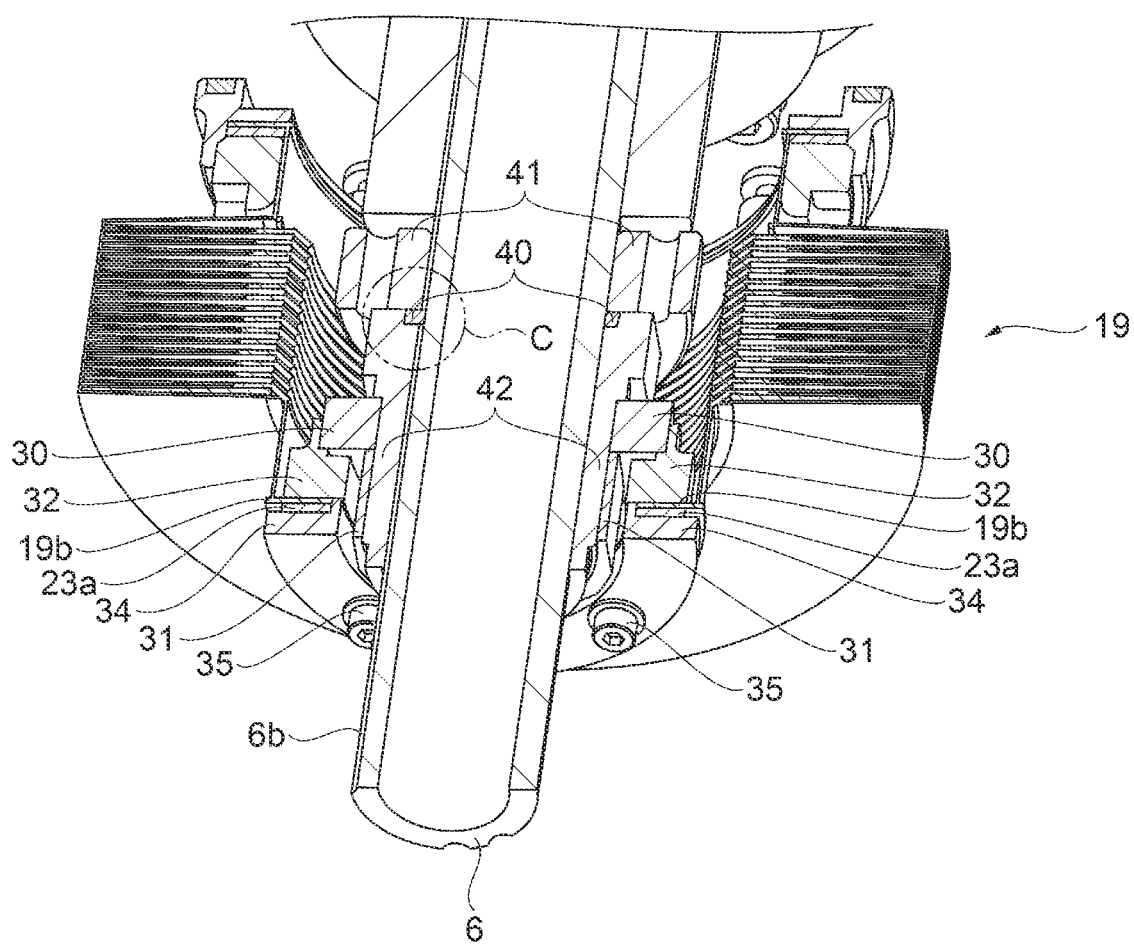
FIG. 10 is a perspective sectional view showing the lower end in FIG. 8.

In the lower end of the cover member 19 shown in FIGS. 8 to 10, the cover member 19, a bearing 30, a bearing nut 31, a bearing holder 32, the elastic sheet 23a, a bearing presser 34, four bolts 35, a shaft packing 40, a stopper portion 41, and a collar portion 42 are provided to surround the shaft 6. A part of the cover member 19, the bearing 30, the bearing nut 31, the bearing holder 32, the elastic sheet 23a, the bearing presser 34, the shaft packing 40, the stopper portion 41, and the collar portion 42 have ring shapes or cylindrical shapes and are placed coaxially with the shaft 6.

The bearing 30 and the bearing holder 32 are formed in the ring shapes.

The bearing 30 is placed in contact with the outer surface of the cylindrical collar portion 42 screwed on the shaft 6, and fixed to the upper end of the cylindrical bearing nut 31. Further, the bearing 30 is also fixed to the bearing holder 32 placed in contact with the outer surface side of the bearing 30.

The end portion 19b of the cover member 19 is located on the lower surface of the bearing holder 32, and the bearing presser 34 is located in the lower part of the end portion 19b via the elastic sheet 23a.

The end portion 19b of the cover member 19 has a flange shape extending from the lower end of the tubular portion in the lower part of the cover member 19 in a direction crossing the axial direction of the shaft 6. In other words, the end portion 19b is formed in a ring shape in a top view projecting from the lower end of the tubular portion in the center axis direction of the shaft 6.

The bearing 30 and the bearing holder 32 are contained inside of the tubular portion in the lower part of the cover member 19, and the end portion 19b is sandwiched by the bearing holder 32 from above and the bearing presser 34 via the elastic sheet 23a from below in the vertical directions.

In these bearing holder 32, elastic sheet 23a, bearing presser 34, and end portion 19b, holes are formed in four locations through which the bolts 35 penetrate. The bolts 35 penetrating the bearing presser 34, the elastic sheet 23a, and the end portion 19b from the lower part of the bearing presser 34 upward in the vertical direction are inserted into the screw holes of the bearing holder 32, fastened, and liquid-tightly fixed.

Next, the shaft packing 40 of the shaft 6 will be explained with reference to FIGS. 9 to 12. The shaft packing 40 of this embodiment corresponds to a packing.

In the lower portion of the shaft 6, the helical groove 6a formed on the outer surface is not provided, but the longitudinal grooves 6b are formed. The shaft packing 40 is provided to prevent entry of water into the SCARA robot 100 from the longitudinal grooves 6b. For the shaft packing 40, a closed-cell sponge is used, and the shaft packing is formed using a silicon sponge in this embodiment.

Figure 12:
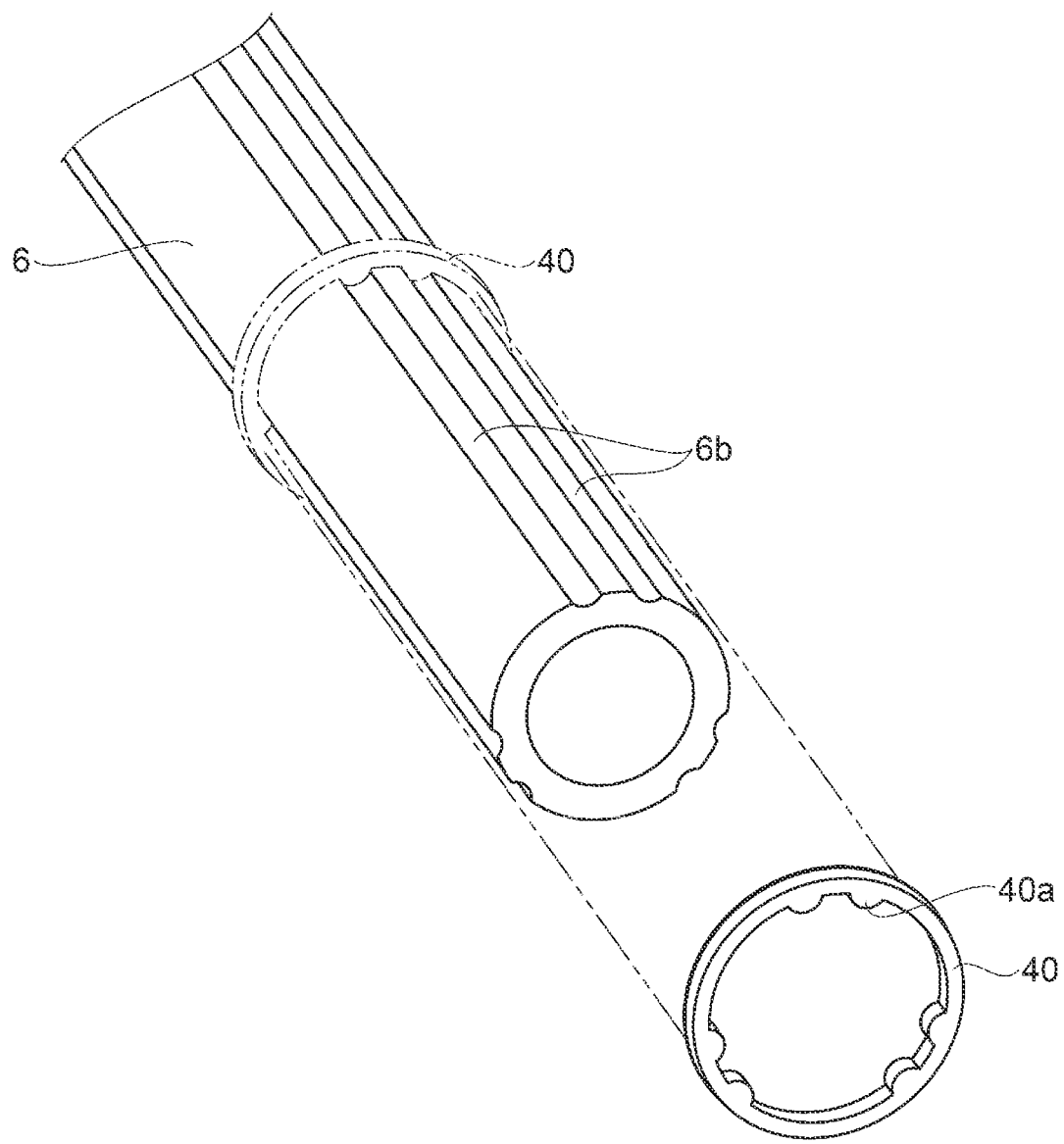
FIG. 12 is a perspective view showing the shaft and a shaft packing.

As shown in FIG. 12, the shaft packing 40 has an inner circumference formed in a shape conformed to the outer surface shape of the shaft 6 and a plurality of convex portions 40a to engage with the plurality of longitudinal grooves 6b. The plurality of convex portions 40a are engaged with the longitudinal grooves 6b and the ring-shaped shaft packing 40 is fitted on the shaft 6.

As shown in FIGS. 9 and 10, the shaft packing 40 is sandwiched by the lower surface of the stopper portion 41 and the upper surface of the collar portion 42 in the extension direction of the shaft 6 and compressed and fixed.

Figure 11:
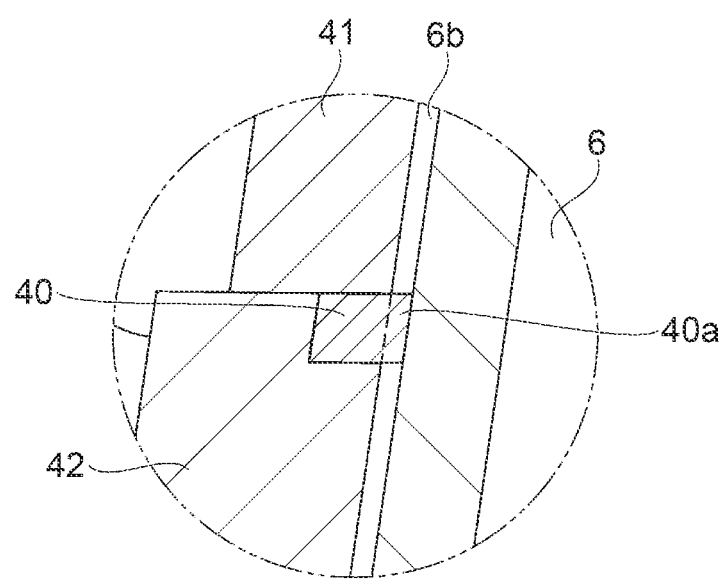
FIG. 11 is a perspective sectional view showing a sealing portion C in FIG. 10.

Thereby, as shown in FIG. 11, the shaft packing 40 is fixed with the longitudinal grooves 6b sealed by the convex portions 40a.

As described above, according to the SCARA robot 100 of the embodiment, unlike a robot of related art without any waterproof structure at the end effector side of the shaft lower portion, the cover member 19 airtightly sealed not only in the upper portion of the shaft 6 but also in the lower portion is provided.

Accordingly, the waterproofing function of preventing entry of liquids from both the upper and lower portions of the shaft is provided, and the robot can be activated even in an environment in which liquids including water are handled.

Therefore, the robot 100 having a good waterproof property may be provided.

Further, the SCARA robot 100 of the embodiment may secure a sealing property of the cover members 18, 19 only by simple work to sandwich and fasten the end portions 18a, 18b of the cover member 18 and the end portions 19a, 19b of the cover member 19 in the vertical directions. Accordingly, compared to fastening by a clamp band requiring the skill of the worker in related art, attachment of the cover members 18, 19 is easier, and thereby, the cover members 18, 19 can be attached regardless of the level of skill of the worker and workability is improved. Further, the higher sealing function is obtained, and thereby, the SCARA robot 100 having higher waterproof performance may be provided.

The SCARA robot 100 of the embodiment may prevent entry of liquids including water into the SCARA robot 100 from the longitudinal grooves 6b by engagement of the plurality of longitudinal grooves 6b in the shaft 6 with the convex portions 40a of the shaft packing 40, and thereby, the SCARA robot 100 having higher waterproof performance may be provided.

Further, the SCARA robot 100 of the embodiment do not require the time to dry because no liquid gasket is used for sealing for waterproofing. Accordingly, assembly work efficiency of the SCARA robot 100 is improved and that leads to reduction of TAT. Furthermore, for disassembly in maintenance or the like, man-hour may be reduced because removal of the liquid gasket is not necessary, and the SCARA robot 100 easy to maintain can be provided.

The robot according to the present disclosure is not limited to the SCARA robot 100 as long as the robot has the BNS shaft, but may be applied to e.g. a vertical articulated robot, a parallel link robot, or a Cartesian robot. These robots may obtain the same functions and effects as those of the above described embodiment.

Further, the present disclosure may be applied not only to waterproofing but also to oil-proofing and dust-proofing, and thus, options of working environments for introduction of robots can be broadened.

What is claimed is:
1. A robot comprising:
an arm rotating around a first axis, the first axis extending in a vertical direction; and
a shaft extending in the vertical direction, the shaft being disposed at an end of the arm, the shaft being configured to move along the vertical direction and rotate around a second axis parallel to the first axis, the shaft having a lower part to which an end effector is attached, the shaft having a longitudinal groove extending in the vertical direction along an entirety of the shaft, the shaft having a helical grove except at the lower part;

a collar that is cylindrical-shaped and is fixed on an outer surface of the lower part of the shaft;

a bearing that is ring-shaped and is placed on an outer surface of the collar;

a stopper that is ring-shaped and is placed on the outer surface of the lower part of the shaft, the stopper being located directly adjacent to a top edge of the collar; and a ring-shaped seal that has a convex portion at an inner surface engaging the longitudinal groove and is fitted on the outer surface of the lower part of the shaft, the ring-shaped seal being sandwiched and fixed between the collar and the stopper on the outer surface of the lower part of the shaft along the vertical direction.

2. The robot according to claim 1, further comprising:

a labyrinthine structure extending upward in the vertical direction, the labyrinthine structure being located between a bearing nut and a bearing holder;

wherein the shaft further has an upper part opposite to the lower part along the vertical direction, each of the upper part and the lower part of the shaft has a waterproof cover having a bellows-structure, and the arm is interposed between the waterproof cover at the upper part and the waterproof cover at the lower part, the beating nut fixes a bearing in contact with the shaft and rotates integrally with the shaft, and the bearing holder fixes an end portion of the waterproof cover at the upper part of the shaft in the vertical direction.

3. The robot according to claim 2, wherein the end portion of the waterproof cover at the upper part of the shaft has a flange, and the flange extends crossing the vertical direction, and the end portion is sandwiched and fixed by a base portion and a nut portion in the vertical direction.

4. The robot according to claim 1, wherein, the shaft further has an upper part opposite to the lower part along the vertical direction, and each of the upper oar and the lower part of the shaft has a waterproof cover having a bellows-structure, and the arm is interposed between the waterproof cover at the upper part and the waterproof cover at the lower part.

5. The robot according to claim 4, further comprising:

a labyrinthine structure extending upward in the vertical direction, the labyrinthine structure being located between a bearing nut and a bearing holder, wherein the bearing nut fixes a bearing in contact with the shaft and rotates integrally with the shaft, and the bearing holder fixes an end portion of the waterproof cover at the upper part of the shaft in the vertical direction.

6. The robot according to claim 4, wherein an end portion of the waterproof cover at the upper part of the shaft has a flange, and the flange extends crossing the vertical direction, and the end portion is sandwiched and fixed by a base portion and a nut portion in the vertical direction.

7. The robot according to claim 1, wherein the robot is a horizontal articulated robot that further includes a supporting arm that moves the arm in a horizontal directions.

* * * * *